United States Patent
Kim

(10) Patent No.: US 12,429,123 B1
(45) Date of Patent: Sep. 30, 2025

(54) POWER TRAIN DEVICE FOR ELECTRIC VEHICLE

(71) Applicant: Hyundai Transys Inc., Seosan-si (KR)

(72) Inventor: Jin Hoon Kim, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 18/968,405

(22) Filed: Dec. 4, 2024

(30) Foreign Application Priority Data

Jul. 24, 2024 (KR) .................. 10-2024-0097971

(51) Int. Cl.
*F16H 37/08* (2006.01)

(52) U.S. Cl.
CPC ... *F16H 37/082* (2013.01); *F16H 2200/0021* (2013.01); *F16H 2200/201* (2013.01); *F16H 2200/2097* (2013.01)

(58) Field of Classification Search
CPC . F16H 37/082; B60K 2001/001; B60K 17/08; B60K 17/165
See application file for complete search history.

(56) References Cited

U.S. PATENT DOCUMENTS

| | | | | |
|---|---|---|---|---|
| 11,472,277 | B2 * | 10/2022 | Glückler | ............. B60K 1/02 |
| 11,846,343 | B2 * | 12/2023 | Glückler | ............. B60K 1/02 |

FOREIGN PATENT DOCUMENTS

| | | | | |
|---|---|---|---|---|
| DE | 102023209847 A1 * | 4/2025 | ............. B60K 1/00 |
| KR | 10-2007-0076773 A | 7/2007 | |

* cited by examiner

*Primary Examiner* — Derek D Knight
(74) *Attorney, Agent, or Firm* — Bridgeway IP Law Group, PLLC; Jihun Kim

(57) ABSTRACT

A power train device for an electric vehicle includes a first planetary gear set including a first sun gear, a first planet gear, and a first carrier, a second planetary gear set including a second planet gear and a first ring gear, and a third planetary gear set including a second sun gear, a third planet gear, a second carrier, and a second ring gear.

11 Claims, 4 Drawing Sheets

POWER TRAIN DEVICE FOR ELECTRIC VEHICLE

CROSS-REFERENCE TO RELATED APPLICATIONS

This application claims priority to and the benefit of Korean Patent Application No. 10-2024-0097971 filed in the Korean Intellectual Property Office on Jul. 24, 2024, the entire contents of which are incorporated herein by reference.

TECHNICAL FIELD

The present invention relates to a power train device for an electric vehicle.

BACKGROUND ART

A power train device for an electric vehicle in the related art is configured to transmit power by means of engagement structures between external gears provided on a plurality of power transmission shafts. Because the power train device for an electric vehicle occupies a large vehicle mounting space, it is difficult to design a package. Because the power train device for an electric vehicle has a structure in which an input shaft of a motor, the power transmission shaft having the external gear, and an axle shaft are arranged in a row at predetermined intervals, there are many limitations in mounting the power train device for an electric vehicle in the vehicle. Furthermore, because the power train device for an electric vehicle in the related art has a single gear shift position, a process of controlling a speed of the vehicle may be performed only by the motor.

DOCUMENT OF RELATED ART

[Patent Document]
(Patent Document 1) Korean Patent Application Laid-Open No. 10-2007-0076773 (published on Jul. 25, 2007)

SUMMARY OF THE INVENTION

The present invention has been made in an effort to solve the above-mentioned problem, and an object of the present invention is to provide a power train device for an electric vehicle that makes it easy to mount a package of a vehicle by virtue of a speed reduction structure implemented by a plurality of planetary gear sets.

In order to achieve the above-mentioned object, the present invention provides a power train device for an electric vehicle, the power train device including: a first planetary gear set including a first sun gear rotatably mounted on one side axle shaft, a first planet gear configured to externally engage with the first sun gear, and a first carrier configured to support the first planet gear; a second planetary gear set including a second planet gear provided at one side of the first planet gear and supported by the first carrier together with the first planet gear, and a first ring gear configured to externally engage with the second planet gear while surrounding the second planet gear; and a third planetary gear set including a second sun gear rotatably mounted on one side axle shaft so as to be opposite to the first carrier, a third planet gear configured to externally engage with the second sun gear, a second carrier configured to support the third planet gear, and a second ring gear configured to externally engage with the third planet gear while surrounding the third planet gear, in which a sleeve is provided between the first carrier and the second carrier, and in which the sleeve transmits power between the first carrier and the second sun gear while moving in a first shift position engagement direction or transmits power between the first carrier and the second carrier while moving in a second shift position engagement direction.

In addition, the sleeve may perform a first shift position engagement operation or a second shift position engagement operation while being moved in an axial direction by a controller.

In addition, the sleeve may be spline-coupled to a first hub provided at one side of the first carrier at ordinary times, and the first hub may be opposite to a second hub provided at one side of the second carrier.

In addition, the sleeve may include: a first spline provided on an outer-diameter portion; and a second spline provided on an inner-diameter portion, and during the first shift position engagement operation of the sleeve, the first spline may engage with a third spline provided on an inner-diameter portion of the first hub, and the second spline may engage with a fourth spline configured at one side of the second sun gear.

In addition, during the second shift position engagement operation of the sleeve, the first spline may engage with the third spline, and the second spline may engage with a fifth spline provided on an outer-diameter portion of the second hub.

In addition, the second carrier may be connected to a differential device.

In addition, the differential device may include: a casing connected to the other side of the second carrier; a pinion gear connected to the casing by a connection shaft in the casing and configured to be rotatable about the connection shaft; one side gear connected to one side axle shaft while engaging with one side of the pinion gear; and the other side gear connected to the other side axle shaft while engaging with the other side of the pinion gear.

In addition, one side axle shaft may be connected to one side driving wheel, and the other side axle shaft may be connected to the other side driving wheel.

In addition, the first sun gear may be connected to an input shaft of a motor.

In addition, the input shaft may be a hollow shaft rotatably mounted on an outer-diameter portion of one side axle shaft and configured to transmit power of the motor to the first sun gear.

In addition, the first ring gear and the second ring gear may be fixed to an axle housing.

According to the present invention, the package of the vehicle is easily mounted by virtue of the speed reduction structure implemented by the plurality of planetary gear sets.

In addition, according to the present invention, the two gear shift positions enable low-speed vehicle speed control and high-speed vehicle speed control.

In addition, according to the present invention, the plurality of planetary gear sets is provided, such that the plurality of planetary gear sets does not occupy a large space when being mounted in the vehicle.

In addition, according to the present invention, the shift operation may be controlled by the operation of the sleeve.

In addition, according to the present invention, the number of components may be reduced, such that costs and weight may be reduced, and the assembling process may be simplified, in comparison with a power train device for an electric vehicle in the related art.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
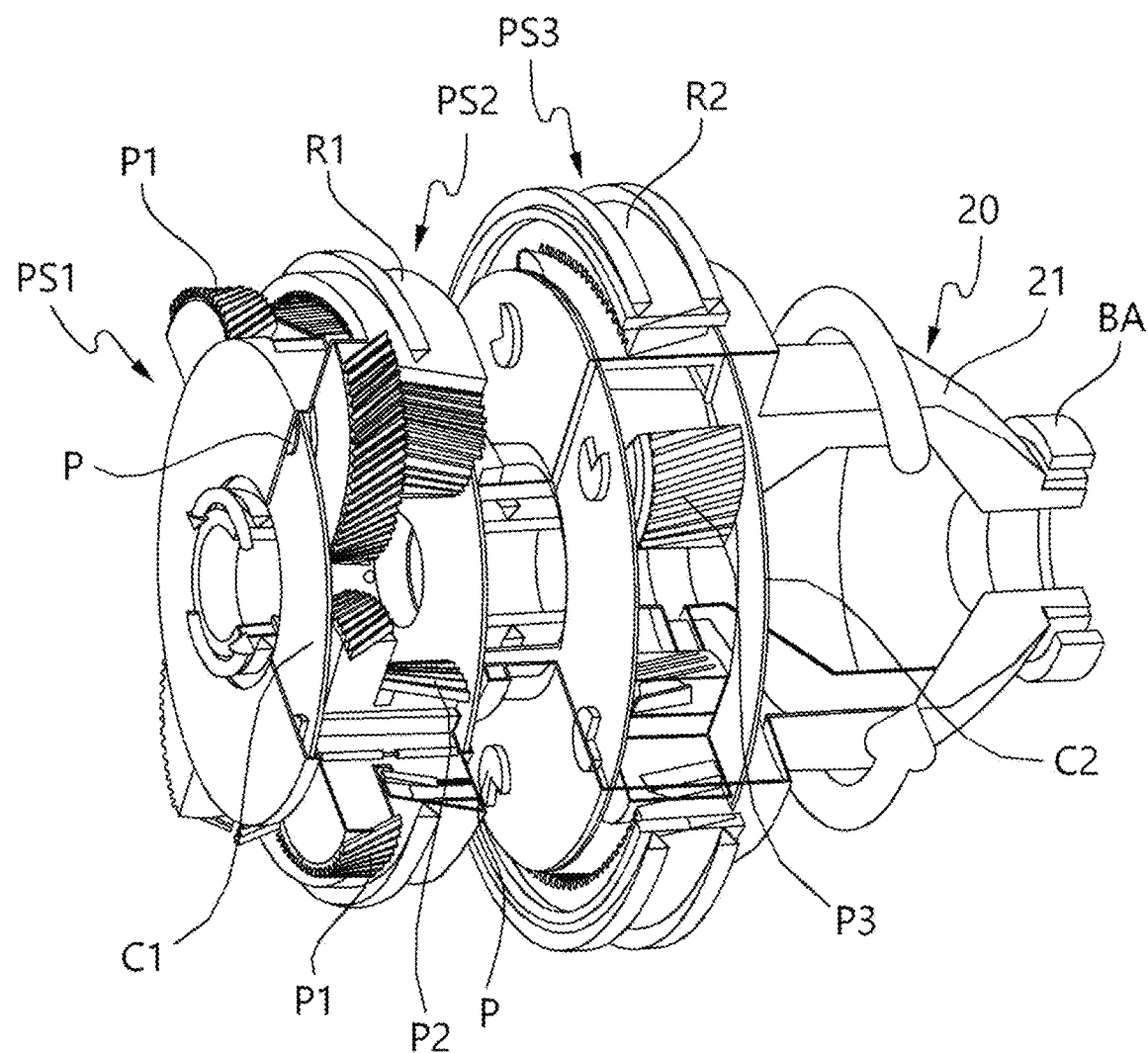
FIG. 1 is a perspective view of a power train device for an electric vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
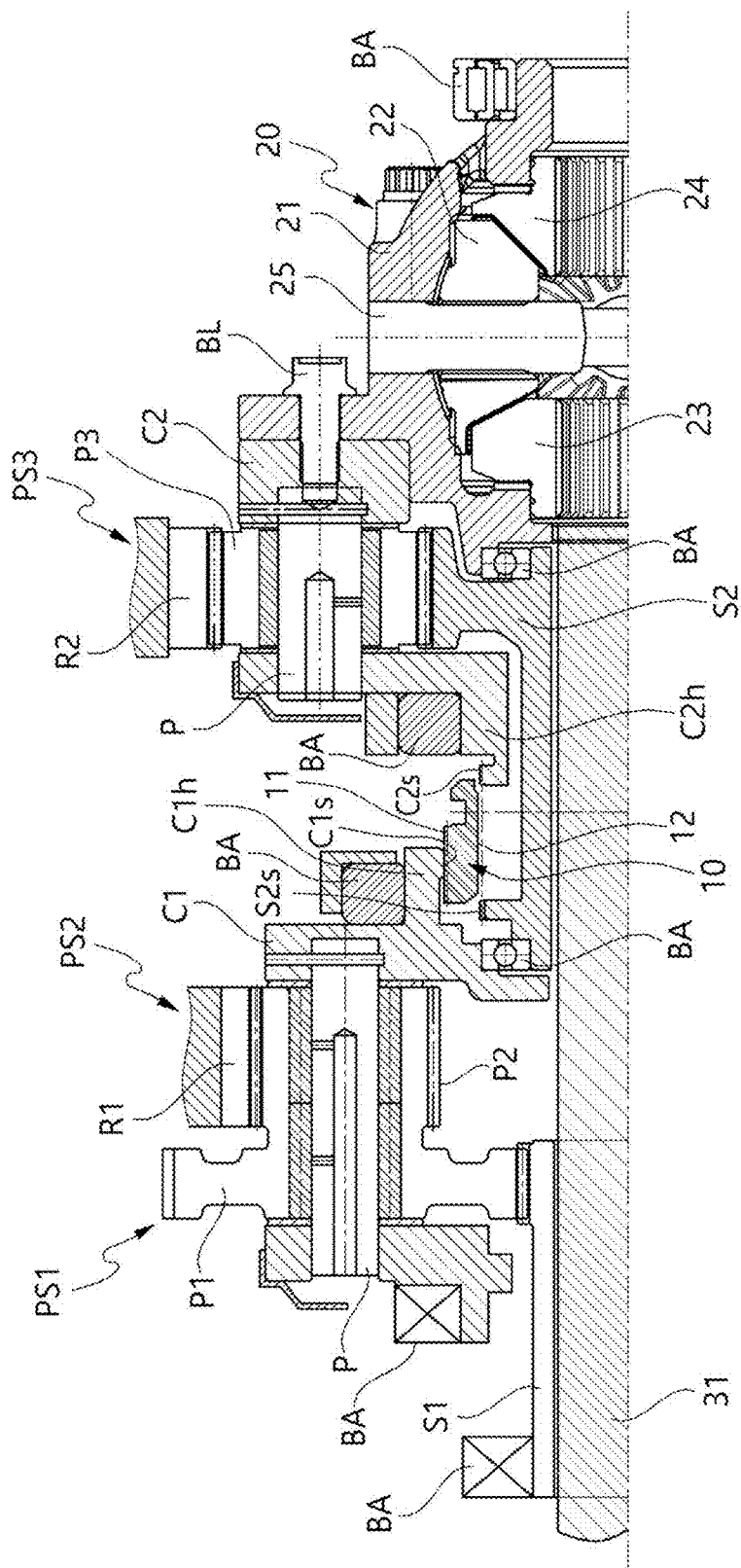
FIG. 2 is a cross-sectional side view of the power train device for an electric vehicle according to the exemplary embodiment of the present invention.

FIG. 1 is a perspective view of a power train device for an electric vehicle according to an exemplary embodiment of the present invention, and FIG. 2 is a cross-sectional side view of the power train device for an electric vehicle according to the exemplary embodiment of the present invention.

As illustrated in FIGS. 1 and 2, the power train device may include a first planetary gear set PS1, a second planetary gear set PS2, and a third planetary gear set PS3 that transmit power of a motor MG. The first planetary gear set PS1, the second planetary gear set PS2, and the third planetary gear set PS3 may be mounted in an axle housing (not illustrated).

The first planetary gear set PS1 may include a first sun gear S1, first planet gears P1, and a first carrier C1. The power transmitted to the first sun gear S1 may be transmitted to the first planet gear P1.

The first sun gear S1 may be rotatably mounted on an outer-diameter portion of one side axle shaft 31. The first planet gears P1 may be provided as a plurality of first planet gears P1 provided along the outer-diameter portion of the first sun gear S1. The first planet gear P1 may engage (interlock) with the first sun gear S1 so as to be externally in contact with the first sun gear S1.

The first carrier C1 may support the first planet gear P1. The first planet gear may be connected to the first carrier C1 by a pin P. The first planet gear P1 may rotate about the pin P.

The second planetary gear set PS2 may include second planet gears P2 and a first ring gear R1. The power, which is transmitted from the first planet gear P1 to the second planet gear P2, may be transmitted to the first carrier C1.

The first planet gear P1 and the second planet gear P2 may be integrated. The second planet gear P2 may rotate integrally with the first planet gear P1. The second planet gear P2 may be configured at one side of the first planet gear P1. The second planet gear P2 may have a smaller size than the first planet gear P1. The second planet gear P2, together with the first planet gear P1, may be supported by the first carrier C1.

The pin P may penetrate centers of the integrated first and second planet gears P1 and P2 and be coupled to the first carrier C1.

The first ring gear R1 may be configured to surround the second planet gear P2. The first ring gear R1 may be fixed (F) to the axle housing (not illustrated). The first ring gear R1 may engage with the second planet gear P2 so as to be externally in contact with the second planet gear P2.

The third planetary gear set PS3 may include a second sun gear S2, third planet gears P3, a second carrier C2, and a second ring gear R2. The power of the first carrier C1 may be transmitted to the second sun gear S2 or the second carrier C2.

The power, which is transmitted from the first carrier C1 to the second sun gear S2, may be transmitted to a casing 21 of a differential device 20 through the third planet gear P3 and the second carrier C2.

The power, which is transmitted from the first carrier C1 to the second carrier C2, may be transmitted to the casing 21 of the differential device 20.

The second sun gear S2 may be configured to be opposite to the first carrier C1. The second sun gear S2 may be rotatably mounted on the outer-diameter portion of one side axle shaft 31.

The third planet gears P3 may be provided as a plurality of third planet gears P3 provided along the outer-diameter portion of the second sun gear S2. The third planet gear P3 may engage with the second sun gear S2 so as to be externally in contact with the second sun gear S2.

The second carrier C2 may support the third planet gear P3. The third planet gear P3 may be connected to the second carrier C2 by the pin P. The third planet gear P3 may rotate about the pin P. The pin P may be coupled to the second carrier C2 while penetrating a center of the third planet gear P3.

The second ring gear R2 may be configured to surround the third planet gear P3. The second ring gear R2 may be fixed (F) to the axle housing (not illustrated). The second ring gear R2 may engage with the third planet gear P3 so as to be externally in contact with the third planet gear P3.

A sleeve 10 may be provided between the first carrier C1 and the second carrier C2. The sleeve 10 may be spline-coupled to a first hub C1$h$ provided at one side of the first carrier C1. The sleeve 10 may transmit power between the first carrier C1 and the second sun gear S2 while moving in a first shift position engagement direction. The sleeve 10 may transmit power between the first carrier C1 and the second carrier C2 while moving in a second shift position engagement direction.

The sleeve 10 may perform a first shift position engagement operation or a second shift position engagement operation while being moved in an axial direction by a controller. For example, the controller may be an actuator.

The sleeve 10 may be spline-coupled to the first hub C1*h* of the first carrier C1 at ordinary times. The first hub C1*h* may be configured to be opposite to a second hub C2*h* provided at one side of the second carrier C2.

The sleeve 10 may include a first spline 11 and a second spline 12. The first spline 11 may be provided on an outer-diameter portion of the sleeve 10. The second spline 12 may be provided on an inner-diameter portion of the sleeve 10.

During the first shift position engagement operation of the sleeve 10, the first spline 11 may engage with a third spline C1*s* provided on an inner-diameter portion of the first hub C1*h*, and the second spline 12 may engage with a fourth spline S2*s* configured at one side of the second sun gear S2. Therefore, the power of the first carrier C1 may be transmitted to the second sun gear S2.

During the second shift position engagement operation of the sleeve 10, the first spline 11 may engage with the third spline C1*s* of the first hub C1*h*, and the second spline 12 may engage with a fifth spline C2*s* provided on an outer-diameter portion of the second hub C2*h*. Therefore, the power of the first carrier C1 may be transmitted to the second carrier C2.

The other side of the second carrier C2 may be connected to the casing 21 of the differential device 20 by a coupling member BL such as a bolt. The coupling member BL may penetrate the casing 21 of the differential device 20 and be coupled to the other side of the second carrier C2.

The power transmitted to the second carrier C2 may be transmitted to the casing 21 of the differential device 20.

The differential device 20 may include the casing 21, a pinion gear 22, one side gear 23, and the other side gear 24. The pinion gear 22, one side gear 23, and the other side gear 24 may be mounted in the casing 21.

The power transmitted to the casing 21 may be bidirectionally transmitted to one side gear 23 and the other side gear 24 from the pinion gear 22.

The pinion gear 22 may be connected to the casing 21 by a connection shaft 25. The connection shaft 25 may be coupled to penetrate a center of the pinion gear 22 from the outside of the casing 21. The pinion gear 22 may rotate about the connection shaft 25 in the casing 21.

One side gear 23 may engage with one side of the pinion gear 22. One side gear 23 may be connected to one side axle shaft 31. One side axle shaft 31 may be connected to one side driving wheel 41. The power transmitted to one side gear 23 may be transmitted to one side driving wheel 41 through one side axle shaft 31.

The other side gear 24 may engage with the other side of the pinion gear 22. The other side gear 24 may be connected to the other side axle shaft 32. The other side axle shaft 32 may be connected to the other side driving wheel 42. The power transmitted to the other side gear 24 may be transmitted to the other side driving wheel 42 through the other side axle shaft 32.

The first sun gear S1 may be connected to an input shaft IS of the motor MG. The power of the motor MG may be transmitted to the first sun gear S1 through the input shaft IS.

The input shaft IS may be a hollow shaft. The input shaft IS may be rotatably mounted on the outer-diameter portion of one side axle shaft 31.

The first sun gear S1, the first carrier C1, the second sun gear S2, the second carrier C2, and the casing 21 may be supported by a bearing BA.

Figure 3:
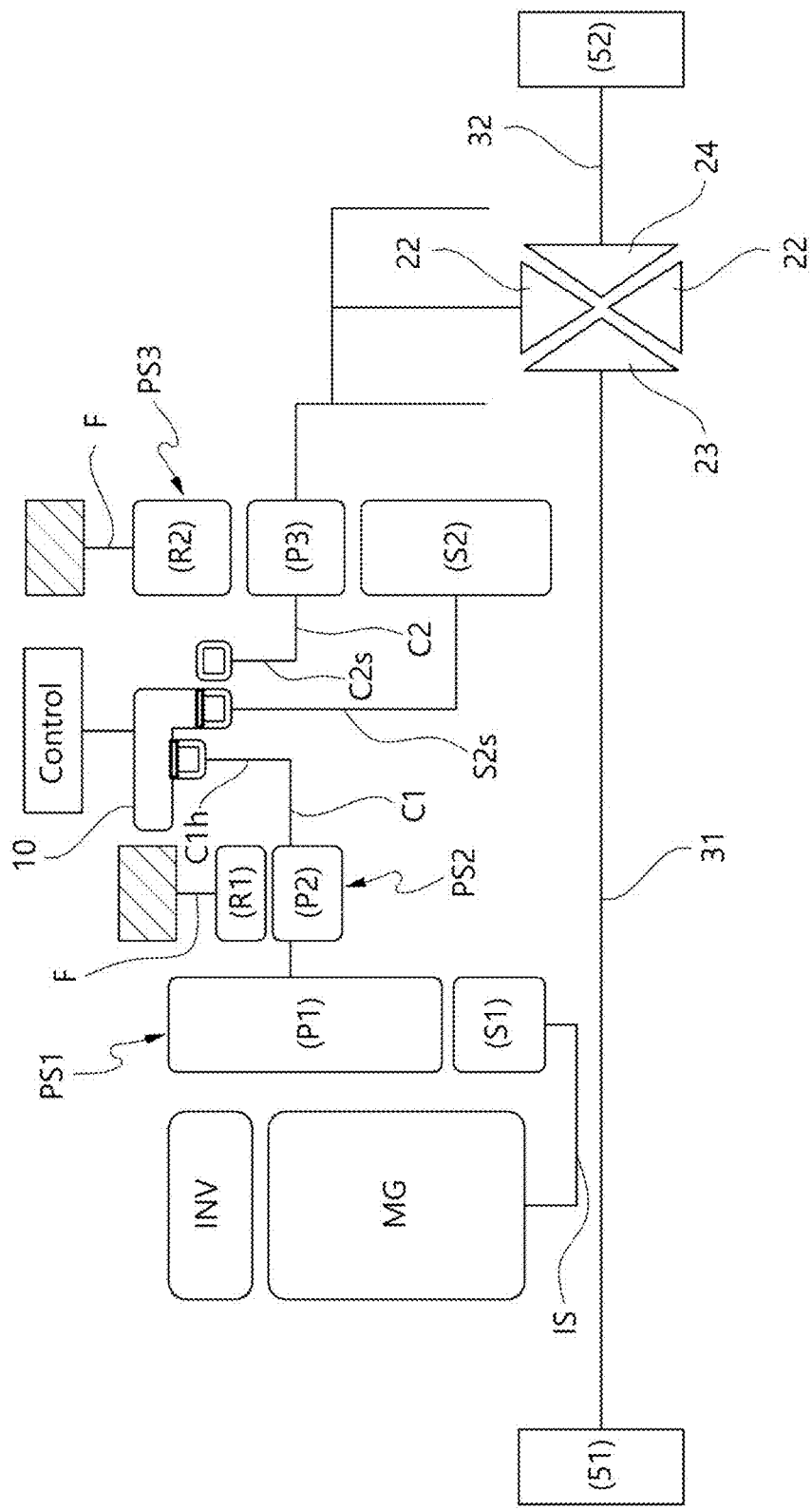
FIG. 3 is a view illustrating an operation in a first shift position according to the exemplary embodiment of the present invention.

FIG. 3 is a view illustrating an operation in a first shift position according to the exemplary embodiment of the present invention.

As illustrated in FIG. 3, the motor MG may be connected to an inverter INV.

Next, the operation in the first shift position of the present invention will be described.

As illustrated in FIGS. 2 and 3, during the first shift position, the sleeve 10 may move in the first shift position engagement direction, such that the first spline 11 of the sleeve 10 may engage with the third spline C1*s* of the first hub C1*h*, and the second spline 12 of the sleeve 10 may engage with the fourth spline S2*s* of the second sun gear S2.

The first spline 11 of the sleeve 10 may engage with the third spline C1*s* of the first hub C1*h*, and the second spline 12 of the sleeve 10 may engage with the fourth spline S2*s* of the second sun gear S2, such that the power may be transmitted between the first carrier C1 and the second sun gear S2.

The power of the motor MG may be transmitted to the first sun gear S1 through the input shaft IS in the state in which the power may be transmitted between the first carrier C1 and the second sun gear S2.

The power to be transmitted to the first sun gear S1 may be transmitted to the first carrier C1 through the first planet gear P1 and the first planet gear P1.

Because the power may be transmitted between the first carrier C1 and the second sun gear S2, the power transmitted to the first carrier C1 may be transmitted to the second carrier C2 through the second sun gear S2 and the third planet gear P3. The speed reduction may be performed during this power transmission process.

Because one side of the second carrier C2 is connected to the casing 21 of the differential device 20, the power transmitted to the second carrier C2 may be transmitted to the casing 21 of the differential device 20.

The power transmitted to the casing 21 may be bidirectionally transmitted to one side gear 23 and the other side gear 24 through the pinion gear 22.

The power transmitted to one side gear 23 may be transmitted to one side driving wheel 41 through one side axle shaft 31, and the power transmitted to the other side gear 24 may be transmitted to the other side driving wheel 42 through the other side axle shaft 32.

Figure 4:
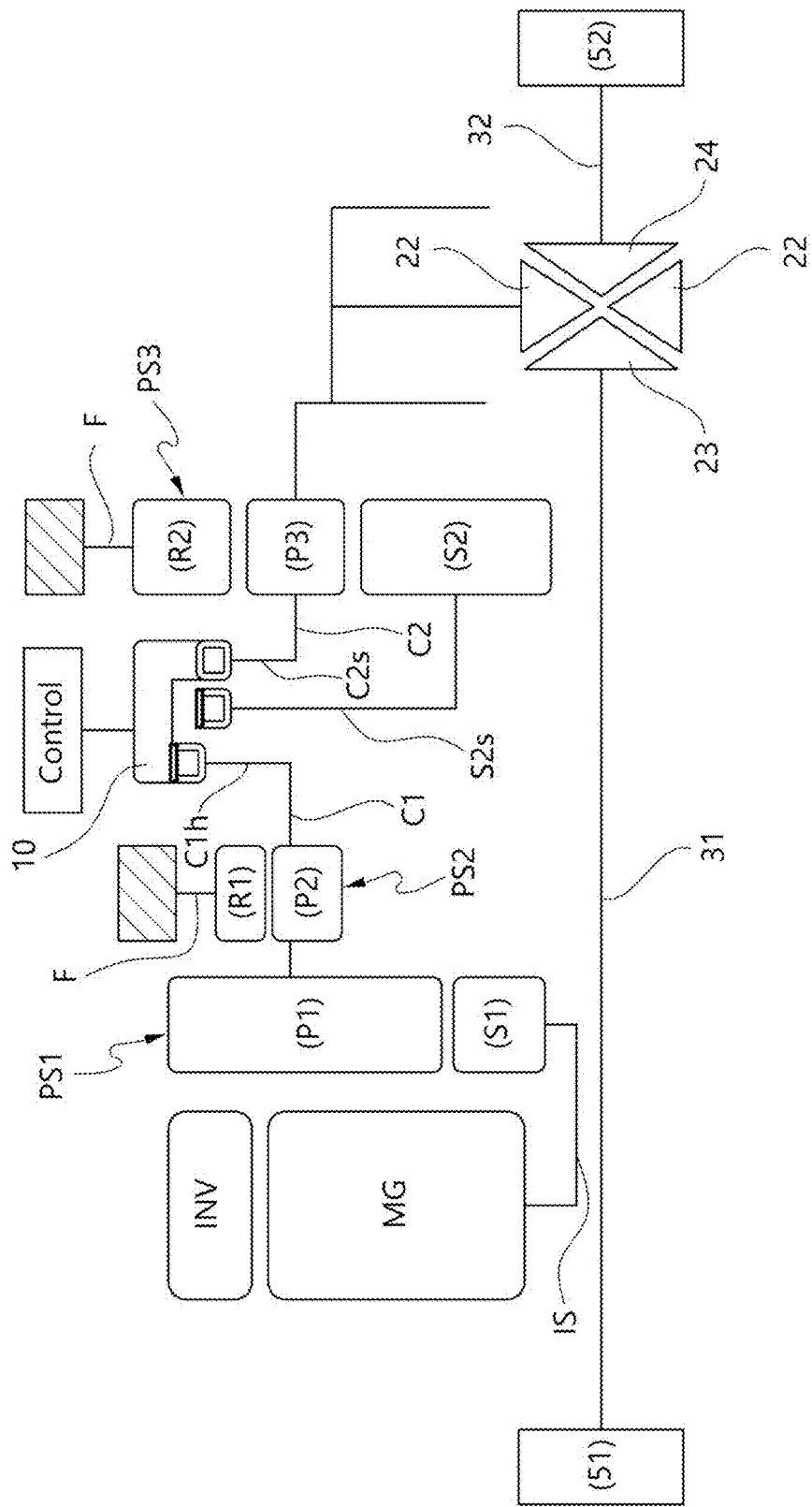
FIG. 4 is a view illustrating an operation in a second shift position according to the exemplary embodiment of the present invention.

Next, the operation in the second shift position of the present invention will be described. FIG. 4 is a view illustrating an operation in the second shift position according to the exemplary embodiment of the present invention.

As illustrated in FIGS. 2 and 4, the sleeve 10 may move in the second shift position engagement direction, such that the first spline 11 of the sleeve 10 may engage with the third spline C1*s* of the first hub C1*h*, and the second spline 12 of the sleeve 10 may engage with the fifth spline C2*s* of the second carrier C2.

The first spline 11 of the sleeve 10 may engage with the third spline C1*s* of the first hub C1*h*, and the second spline 12 of the sleeve 10 may engage with the fifth spline C2*s* of the second carrier C2, such that the power may be transmitted between the first carrier C1 and the second carrier C2.

The power of the motor MG may be transmitted to the first sun gear S1 through the input shaft IS in the state in which the power may be transmitted between the first carrier C1 and the second carrier C2.

The power to be transmitted to the first sun gear S1 may be transmitted to the first carrier C1 through the first planet gear P1 and the first planet gear P1.

Because the power may be transmitted between the first carrier C1 and the second carrier C2, the power transmitted to the first carrier C1 may be transmitted to the second carrier C2. The speed reduction may be performed during this power transmission process.

Because the other side of the second carrier C2 is connected to the casing 21 of the differential device 20, the power transmitted to the second carrier C2 may be transmitted to the casing 21 of the differential device 20.

The power transmitted to the casing 21 may be bidirectionally transmitted to one side gear 23 and the other side gear 24 through the pinion gear 22.

The power transmitted to one side gear 23 may be transmitted to one side driving wheel 41 through one side axle shaft 31, and the power transmitted to the other side gear 24 may be transmitted to the other side driving wheel 42 through the other side axle shaft 32.

As described above, according to the present invention, the package of the vehicle is easily mounted by virtue of the speed reduction structure implemented by the plurality of planetary gear sets. In addition, according to the present invention, the two gear shift positions enable low-speed vehicle speed control and high-speed vehicle speed control. In addition, according to the present invention, the plurality of planetary gear sets is provided, such that the plurality of planetary gear sets does not occupy a large space when being mounted in the vehicle. In addition, according to the present invention, the shift operation may be controlled by the operation of the sleeve. In addition, according to the present invention, the number of components may be reduced, such that costs and weight may be reduced, and the assembling process may be simplified, in comparison with a power train device for an electric vehicle in the related art.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A power train device for an electric vehicle, the power train device comprising:
    a first planetary gear set including:
    a first sun gear rotatably mounted on one side axle shaft,
    a first planet gear configured to externally engage with the first sun gear, and
    a first carrier configured to support the first planet gear;
    a second planetary gear set including:
    a second planet gear disposed at one side of the first planet gear, the second planet gear being supported by the first carrier together with the first planet gear, and
    a first ring gear configured to externally engage with the second planet gear while surrounding the second planet gear; and
    a third planetary gear set including:
    a second sun gear rotatably mounted on the one side axle shaft to be opposite to the first carrier,
    a third planet gear configured to externally engage with the second sun gear,
    a second carrier configured to support the third planet gear, and
    a second ring gear configured to externally engage with the third planet gear while surrounding the third planet gear,
    wherein a sleeve is disposed between the first carrier and the second carrier, and
    wherein the sleeve is configured to transmit power between the first carrier and the second sun gear while moving in a first shift position engagement direction or transmit power between the first carrier and the second carrier while moving in a second shift position engagement direction.

2. The power train device of claim 1,
    wherein the sleeve is configured to perform a first shift position engagement operation or a second shift position engagement operation while being moved in an axial direction by a controller.

3. The power train device of claim 1,
    wherein the sleeve is spline-coupled to a first hub disposed at one side of the first carrier, and the first hub is positioned opposite to a second hub disposed at one side of the second carrier.

4. The power train device of claim 3,
    wherein the sleeve comprises:
    a first spline defined on an outer-diameter portion of the sleeve; and
    a second spline defined on an inner-diameter portion of the sleeve, and
    wherein during a first shift position engagement operation of the sleeve, the first spline is configured to engage with a third spline defined on an inner-diameter portion of the first hub, and the second spline is configured to engage with a fourth spline defined at one side of the second sun gear.

5. The power train device of claim 4,
    wherein during a second shift position engagement operation of the sleeve, the first spline is configured to engage with the third spline, and the second spline is configured to engage with a fifth spline defined on an outer-diameter portion of the second hub.

6. The power train device of claim 1,
wherein the second carrier is connected to a differential device.

7. The power train device of claim 6,
wherein the differential device comprises:
a casing connected to another side of the second carrier;
a pinion gear connected to the casing by a connection shaft in the casing, the pinion gear being rotatable about the connection shaft;
one side gear connected to the one side axle shaft while engaging with one side of the pinion gear; and
another side gear connected to another side axle shaft while engaging with another side of the pinion gear.

8. The power train device of claim 7,
wherein the one side axle shaft is connected to one side driving wheel, and the another side axle shaft is connected to another side driving wheel.

9. The power train device of claim 1,
wherein the first sun gear is connected to an input shaft of a motor.

10. The power train device of claim 9,
wherein the input shaft is a hollow shaft rotatably mounted on an outer-diameter portion of the one side axle shaft, the input shaft being configured to transmit power of the motor to the first sun gear.

11. The power train device of claim 1,
wherein the first ring gear and the second ring gear are fixed to an axle housing.

\* \* \* \* \*